Patented Dec. 14, 1948

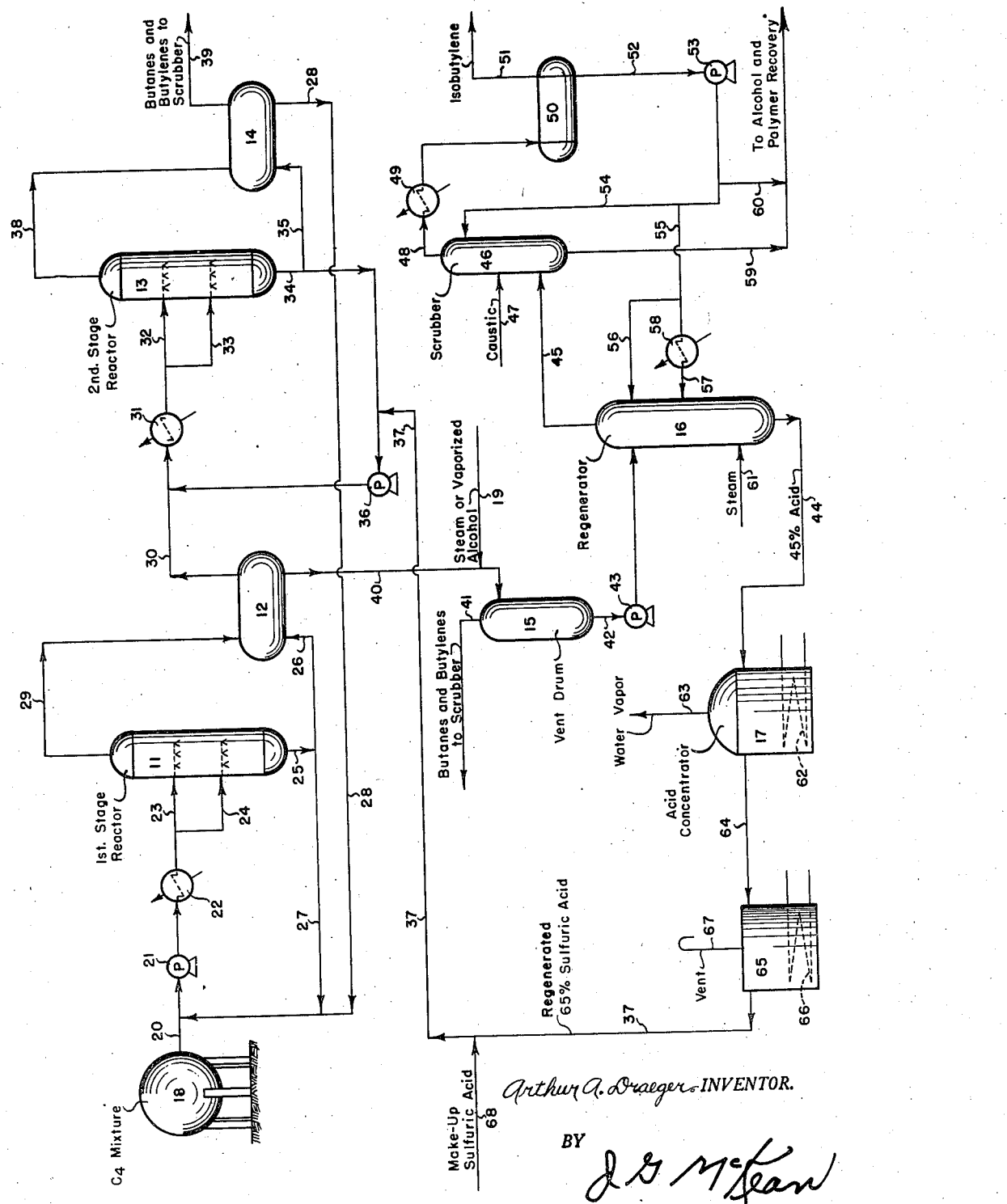

2,456,260

UNITED STATES PATENT OFFICE 2,456,260

PROCESS FOR RECOVERING OLEFINS FROM A HYDROCARBON STREAM

Arthur A. Draeger, Baytown, Tex., assignor, by mesne assignments, to Standard Oil Development Company, Elizabeth, N. J., a corporation of Delaware Application December 20, 1946, Serial No. 717,355

9 Claims. (Cl. 260—677)

The present invention is directed to a method for recovering tertiary olefins from its mixtures with other hydrocarbons having the same number of carbon atoms. More particularly, the present invention is directed to a process comprising the treatment of low molecular weight hydrocarbons including olefins with sulfuric acid to form an extract and the recovery of absorbed and reacted hydrocarbons from the extract to obtain a high purity tertiary olefin.

It is conventional to the art to recover low molecular weight olefins from a hydrocarbon mixture by contacting the mixture with 65% sulfuric acid; although the latter strength of acid is optimum for isobutylene, sulfuric acid of strengths from 60% to 75% may be employed. As an example of a typical operation, a hydrocarbon feed stock including normal butane, isobutylene and normal butylenes may be brought into contact with sulfuric acid in a reaction zone under a pressure substantially in excess of atmospheric in order to form an extract. The pressure on this extract is reduced to substantially atmospheric in a vent drum at about 90° F. with the resultant release of some or most of the butanes and normal butylenes previously absorbed therein. The extract is then sent to a regenerator where isobutylene and residual normal butylenes and butanes along with polymers and alcohols resulting from the reaction of the sulfuric acid with the hydrocarbon mixture are separated as overhead fractions by steam stripping and dilution and the strength of the acid is reduced to 45% concentration. The acid is removed from the regenerator to an acid concentrator where its strength is increased to 65% and then returned to the reaction zone of the system. In conventional operations when the vent drum is operated at about 90° F. to 100° F., substantial amounts of impurities such as normal butylenes and the butanes remain in the acid extract and ultimately contaminate the isobutylene.

In accordance with the present invention contamination of the tertiary olefin, isobutylene, is avoided by operating the vent drum at a temperature in the range between 120° and 130° F. rather than at the aforesaid conventional lower temperature. During the operation at the temperature of 120° to 130° F. atmospheric pressure is maintained on the vent drum. The temperature of the vent drum may be adjusted by heating the extract indirectly by passage through heat exchangers or preferably by direct heating such as may be accomplished by the injection of superheated steam and/or vaporized tertiary butyl alcohol produced in the process and introduced into the extract as it is injected into the vent drum.

The invention will now be described in greater detail in conjunction with the drawing in which the single figure is in the form of a flow sheet illustrating a preferred modification of the present invention.

In the drawing a first stage reactor is designated by 11, a first stage settling drum by 12, a second stage reactor by 13, a second stage settling drum by 14, a vent drum by 15, a regenerator vessel by 16, and an acid concentrator vessel by 17. The mixture of feed hydrocarbons is passed to the system from a vessel 18.

The system shown in the drawing may be described generally as involving a reaction zone, an acid regenerating zone, and an acid concentrating zone. The reaction or absorption zone is divided into two stages, with hydrocarbons flowing through the first and second stages in sequence, and sulfuric acid passed into the second stage and forming an extract therein, the extract taken from the second stage and enriched in the first stage, and the resulting extract from the first stage sent, in turn, through acid regeneration and acid concentration zones. The hydrocarbon feed passes first through first stage reactor 11, and then through second stage reactor 13. Regenerated acid is fed into second stage reactor 13 and forms an extract therein and this extract is fed to first stage reactor 11 to serve as the absorption liquid therein. The enriched extract passes from reactor 11 to settling vessel 12 and is taken from settling vessel 12 through vent drum 15, regenerator 16, and acid concentrator 17, where the acid is restored to its original condition and returned to second stage reactor vessel 13. The vent drum 15 is arranged between settling vessel 12 and regenerator tower 16 in order to allow the release of pressure from the extract before it is sent to the regenerator tower.

In order to allow removal of normal butylenes and the butanes absorbed in the acid extract, the temperature of vent drum 15 is adjusted to a temperature in the range between 120° to 130° F. and preferably in the range between 125° and 130° F. This may be accomplished by adding superheated steam through line 19 into line 40 leading into vent drum 15 or by withdrawing a stream from line 59, which is subsequently described, which contains alcohol and which is heated to vaporize the alcohol before injecting it into the vent drum by suitable connections, not shown, to line 19.

As a typical example, the mixture of hydrocarbon in vessel 18 may consist of 50% of iso and normal butane, 32% normal butylenes and 18% isobutylene. This hydrocarbon mixture is passed from vessel 18 via line 20 in which is arranged pump 21 and heat exchanger 22 and discharges through distributing lines 23 and 24 into first stage reactor vessel 11. The liquid from the bottom of reactor vessel 11 is withdrawn through line 25 and the stream split, with a portion passing through line 26 to first stage settling drum 12 and the remainder being recycled to line 20 via line 27. To the extract flowing through line 27 is added extract withdrawn from the second stage settling drum 14 by line 28. The extract withdrawn from drum 14 and the extract withdrawn from the first stage reactor vessel 11 are mixed in line 27 and the mixture of extract is then discharged into the hydrocarbon stream in line 20.

It is convenient to operate first stage reactor vessel 11 at a temperature of 100° F. and at a pressure of 140 pounds per square inch. The admixture of the extract comprising sulfuric acid with the hydrocarbon mixture in line 20 usually results in such a rise in temperature that it is necessary to cool the mixture with heat exchanger 22 in order to maintain the temperature in reactor vessel 11 at approximately 100° F. The hydrocarbon vapors in first stage reactor vessel 11 which are not absorbed or do not react with sulfuric acid therein are removed as overhead via line 29 and are discharged into the upper portion of first stage settling drum 12. The unabsorbed hydrocarbons from first stage settling drum 12 are passed through line 30 containing heat exchanger 31 and are discharged through lines 32 and 33 into second stage reactor vessel 13. Extract from the lower portion of second stage reactor vessel 13 is withdrawn via line 34 and the stream split with a portion passing through line 35 to second stage settling drum 14 and the remainder passing through pump 36 and discharging into the hydrocarbon stream passing through line 30. Regenerated and reconcentrated sulfuric acid is discharged into line 34 through line 37.

Unabsorbed and unreacted hydrocarbons from reactor vessel 13 pass through line 38 to second stage settling vessel 14 and the unreacted and unabsorbed hydrocarbons from vessel 14 comprising principally iso and normal butane and normal butylenes are withdrawn from outlet line 39. It is convenient to operate second stage reactor vessel 13 at a temperature of 70° F. and under a pressure of 135 pounds per square inch and in order to maintain these temperature and pressure conditions in vessel 13 it will usually be necessary to employ a cooling medium in heat exchanger 31 in order to remove heat resulting from the mixing of hydrocarbons with sulfuric acid in line 30.

With a pressure in first stage reactor vessel 11 of approximately 140 pounds per square inch and in second stage reactor vessel 13 at approximately 135 pounds per square inch the pressure in first stage settling drum 12 is also approximately 135 pounds per square inch. In order to recover hydrocarbons from the extract in settling vessel 12 and regenerate the sulfuric acid used as the extracting agent, it is desirable first to release the pressure on the extract and subsequently subject the extract to a heating operation. In the drawing, the extract from settling vessel 12 is withdrawn through line 40 to vent drum 15 where the pressure is released to atmospheric by vent line 41 while maintaining a temperature between 120° and 130° F. Extract is withdrawn from vent drum 15 via line 42 and pump 43 and discharged into regenerator tower 16. Hydrocarbons in vaporous condition are removed from tower 16 as overhead via outlet 45 and passed into scrubber 46 where they are brought into contact with caustic introduced into the scrubber through inlet 47. The vapors from scrubber 46 are removed through outlet 48 and passed through cooler 49 to condense the high boiling constituents and the cooled mixture is discharged into accumulator 50. Uncondensed materials, substantially isobutylene, are removed in gaseous form from the upper portion of accumulator 50 through outlet 51. Condensate is removed from vessel 50 through line 52 containing pump 53 and the stream split with a portion being passed through line 54 to serve as a scrubbing material in tower 46, another portion passing through lines 55 again divided with one portion discharged through line 56 into an upper part of regenerator tower 16 and the remaining portion passing through line 57 containing heater 58 and discharged into regenerator 16 some distance below the point of discharge of line 56. Liquid is withdrawn from the bottom of scrubber 46 through line 59 and has added thereto condensate withdrawn from vessel 50 via line 52, pump 53 and branch line 60. The liquid mixture in line 59 includes alcohol and polymer and is withdrawn from the system to a suitable arrangement for recovering these valuable products. The mixture in line 59 may be suitably treated to recover a tertiary butyl alcohol fraction which is heated to a temperature sufficiently high so that when it is vaporized and injected into the extract routed to the vent drum a temperature preferably between 125° and 130° F. is maintained therein.

It is desirable to operate regenerator tower 16 with a bottom temperature of approximately 240° F. and a top temperature of 160° F. In addition to the heat added to the tower by heat exchanger 58 heating the stream flowing through line 57, steam may be injected into the bottom of the tower through inlet 61.

Acid is withdrawn from the bottom of the regenerator tower 16 at a concentration of approximately 45% and is passed via line 44 to acid concentrator 17. In this vessel the acid is heated by steam passing through coil 62 and the water vapor derived from the acid is discharged through outlet 63, or may be returned to vessel 16, by means not shown on the drawing, in lieu of a portion of the steam. In concentrator vessel 17 the acid is concentrated to a strength of approximately 65% and is discharged through line 64 to vessel 65 containing cooling coil 66 and vent 67. The acid accumulated in vessel 65 is regenerated acid and is passed through lines 37 and 34 to the hydrocarbon stream passing through line 30 to second stage reactor vessel 13. In order to replace the acid lost in the operation, makeup acid may be introduced in the required amounts through inlet line 68 to the stream of regenerated acid.

When operating the reactor vessels 11 and 13 at temperatures and pressures of 100° F. and 140 pounds per square inch and 70° F. and 135 pounds per square inch, respectively, and with a feed stock having the composition given above, it will be found that goods results may be obtained when withdrawing 235 gallons of feed per minute from vessel 18 and passing 1360 gallons of regenerated acid per minute through line 37 and into the hydrocarbon stream being passed to the second stage reactor vessel 13.

The beneficial results obtained by the present invention will be further illustrated by the following data obtained from a commercial operation in accordance with the present invention in which the temperature of the vent drum 15 was varied from 90° F. to 130° F.:

| 1 | 2 | 3 | 4 |
|---|---|---|---|
| Vent Drum Temp., ° F. | Per Cent Impurities in Purified Isobutylene | | |
| | Butylene-1 | Butylene-2 | Iso and n-Butane |
| 90 | 1.0 | 1.0 | 1.0 |
| 100 | 0.8 | 0.62 | 0.55 |
| 110 | 0.65 | 0.35 | 0.20 |
| 120 | 0.50 | 0.15 | trace |
| 130 | 0.45 | 0.05 | trace |

It will be apparent from the foregoing data that when operating in accordance wtih the temperature range of the present invention, the butylene-1 content has been decreased by 50%, the butylene-2 content by at least 85%, and the iso and n-butane content of the isobutylene substantially eliminated.

The nature and objects of the present invention having been fully described and illustrated, what I wish to claim as new and useful and to secure by Letters Patent is:

1. In a system for recovering tertiary olefin from a predominantly $C_4$ hydrocarbon feed stock comprising olefins involving contacting the feed stock with sulfuric acid in a reaction zone under conditions to form an extract, the removal of the extract from the reaction zone to a regeneration zone where the extract is heated under a pressure substantially less than that of the reaction zone to cause vaporization of a major portion of the hydrocarbons from said extract and recovery of the extract and the recycling of the recovered sulfuric acid to the reaction zone, the step of heating said extract after it has been removed from the reaction zone and before it is sent to the regeneration zone to a temperature above the temperature at which the extract is formed and below the temperature to which it is heated in the regeneration zone whereby a product of improved purity is obtained.

2. A method in accordance with claim 1 in which the temperature to which the extract is heated is between 120° F. and 130° F.

3. In a process for removing olefins from a hydrocarbon stream comprising a substantial portion of $C_4$ hydrocarbons and appreciable amounts of olefins including the steps of contacting the stream with sulfuric acid in a reaction zone under conditions to form an extract and the heat treatment of the resulting extract in an acid regeneration zone to separate hydrocarbons from the acid and recover acid of approximately the same concentration as employed in the reaction zone, the intermediate step of heating said extract after it has been removed from the reaction zone and before it is sent to the regeneration zone in an intermediate heating zone to a temperature above the temperature at which the extract is formed and below the temperature to which the extract is heated to separate absorbed hydrocarbons and recover acid.

4. A process in accordance with claim 3 in which the intermediate temperature is in the range between 120° F. and 130° F.

5. A method for recovering isobutylene from its mixtures with other $C_4$ hydrocarbons which comprises the steps of contacting a $C_4$ hydrocarbon fraction containing isobutylene with sulfuric acid of a strength between 60% and 70% under suitable temperature and pressure conditions to form an extract phase and an unreacted hydrocarbon phase, separating the latter, injecting into the extract phase a heated fluid at a temperature sufficient to maintain said extract phase at a temperature between 120° F. and 130° F. and at a pressure less than that under which the extract is formed to remove therefrom $C_4$ hydrocarbons other than isobutylene, and subsequently heating the extract to a temperature between 160° F. and 240° F. to recover isobutylene.

6. A method in accordance with claim 5 in which the heated fluid is steam.

7. A method in accordance with claim 5 in which the heated fluid comprises vaporized butyl alcohol.

8. A method in accordance with claim 5 in which the heated fluid comprises steam and alcohol vapor.

9. A method for recovering isobutylene from its mixtures with other $C_4$ hydrocarbons which comprises the steps of contacting a $C_4$ hydrocarbon fraction containing isobutylene with sulfuric acid of a strength between 60% and 70% under suitable temperature and pressure conditions to form an extract phase and an unreacted hydrocarbon phase, separating the latter, heating the separated extract to a temperature between 120° and 130° F., maintaining a pressure on the heated extract sufficient to remove therefrom substantially all $C_4$ hydrocarbons other than isobutylene, and heating the extract to a temperature between 160° F. and 240° F. to recover isobutylene.

ARTHUR A. DRAEGER.

REFERENCES CITED

The following references are of record in the file of this patent:

UNITED STATES PATENTS

| Number | Name | Date |
|---|---|---|
| 2,388,928 | Morrell et al. | Nov. 13, 1945 |
| 2,400,376 | Showalter | May 14, 1946 |
| 2,417,048 | Antonio | Mar. 11, 1947 |